United States Patent [19]
Werjefelt

[11] Patent Number: 5,947,415
[45] Date of Patent: Sep. 7, 1999

[54] EMERGENCY VISION DEVICE

[76] Inventor: Bertil R. L. Werjefelt, 277 Kaha, Kailua, Hi. 96734

[21] Appl. No.: 08/851,460

[22] Filed: May 5, 1997

Related U.S. Application Data

[60] Provisional application No. 60/017,591, May 14, 1996.
[51] Int. Cl.⁶ .............................. B64D 11/00; B64C 1/10
[52] U.S. Cl. .......................................... 244/118.5; 244/121
[58] Field of Search ................................ 244/118.5, 121; 280/732, 731; 359/894

[56] References Cited

U.S. PATENT DOCUMENTS

| | | | |
|---|---|---|---|
| 3,981,302 | 9/1976 | Veit | 244/118.5 |
| 4,559,939 | 12/1985 | Levine et al. | 128/201.28 |
| 4,832,287 | 5/1989 | Werjefelt . | |
| 5,078,343 | 1/1992 | Howlett | 244/118.5 |
| 5,202,796 | 4/1993 | Werjefelt . | |
| 5,318,250 | 6/1994 | Werjefelt . | |

Primary Examiner—Charles T. Jordan
Assistant Examiner—Theresa M. Wesson
Attorney, Agent, or Firm—Shlesinger, Arkwright & Garvey LLP

[57] ABSTRACT

An emergency vision device for use in a smoke emergency to enable an user to look through a windshield or view an instrument, comprises a housing; an inflatable enclosure having a first end for being disposed toward an user, a second end for being disposed toward the windshield or the instrument, the inflatable enclosure being stored within the housing when not in use, the first and second ends having first and second transparent panels, respectively, such that visual information from beyond the windshield or from the instrument is transmitted through the second panel to the user through the first panel; a blower operably connected to the inflatable enclosure adapted to inflate the enclosure; a first switch for operating the blower; and a member operably connected to the inflatable enclosure and the first switch such that the switch is activated when the inflatable enclosure is removed from the housing.

16 Claims, 5 Drawing Sheets

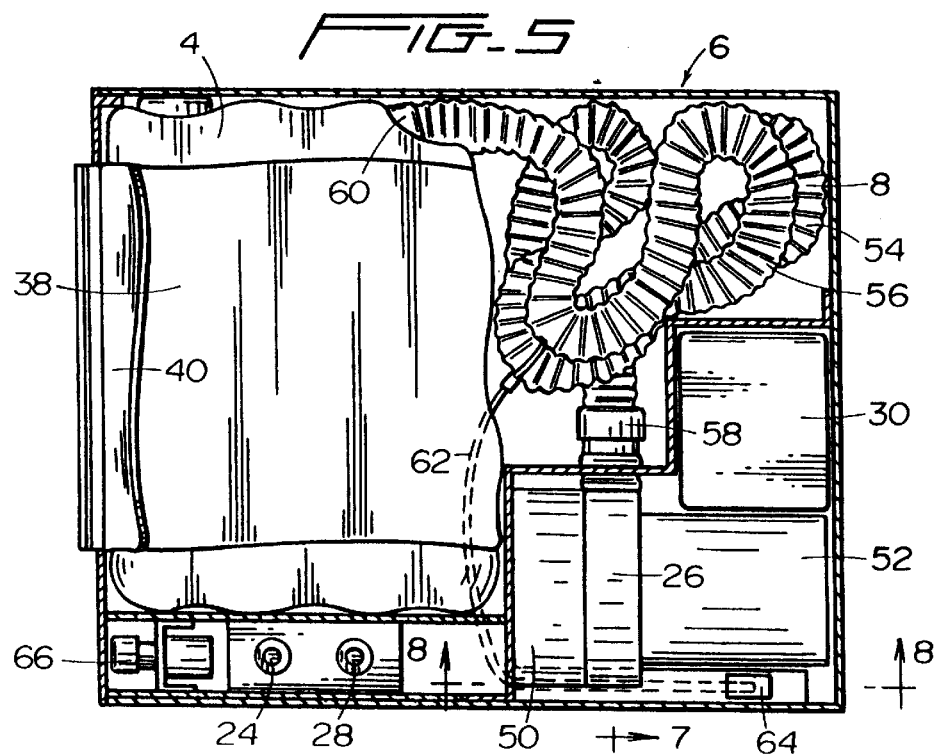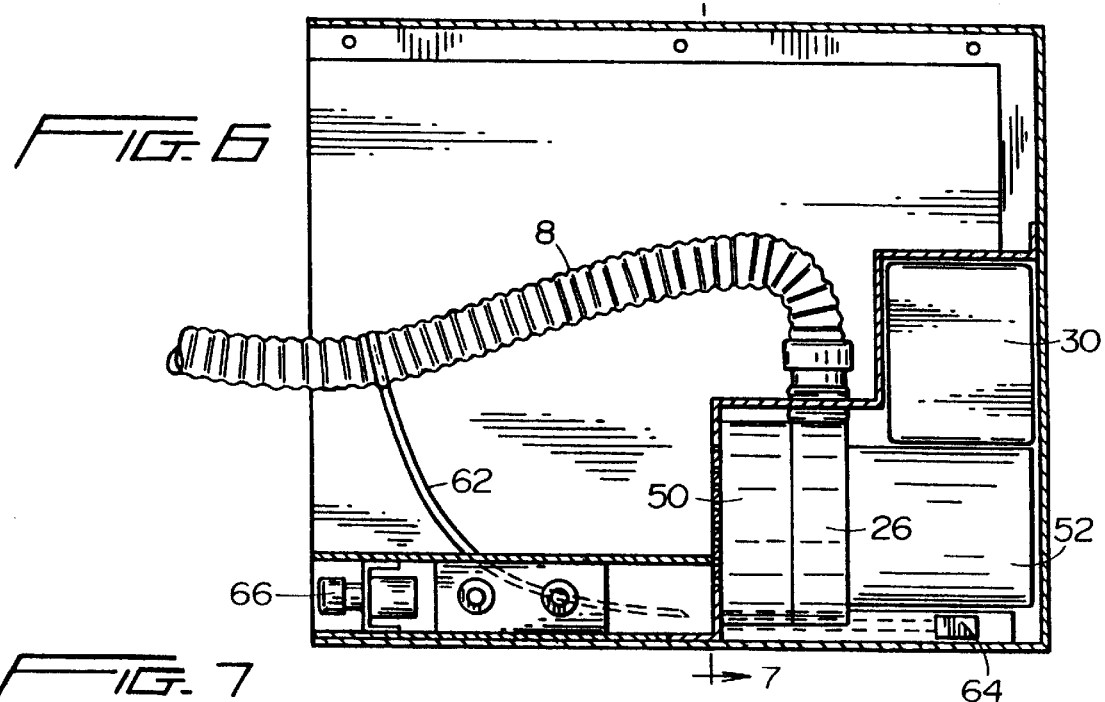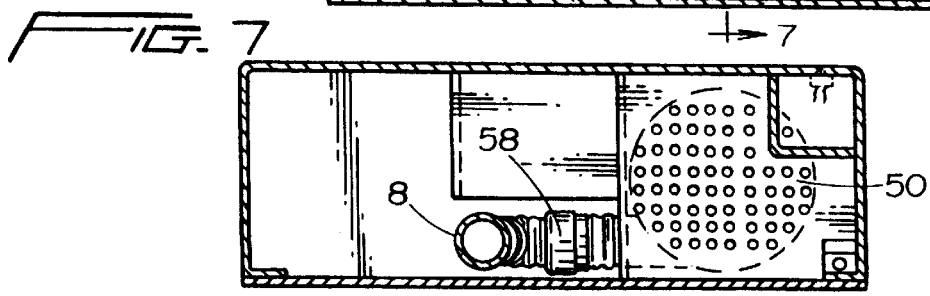

5,947,415

EMERGENCY VISION DEVICE

RELATED APPLICATION

This is a nonprovisional application based on provisional application Ser. No. 60/017,591, filed May 14, 1996.

FIELD OF THE INVENTION

The present invention relates generally to an apparatus to enable an operator to maintain visual contact with an instrument or other visual sources of data after smoke and/or particulate matter from a fire has invaded the operator's environment. In particular, the present invention relates to an inflatable enclosure that fills the space between a pilot and the windshield and/or instrument panel along the pilot's line of sight, the enclosure being adapted to permit the pilot to see therethrough to the windshield and/or the instrument panel, thereby providing him with vital information for guiding the aircraft to a safe landing after smoke and/or particulate matter from an on-board fire invades the cockpit area.

BACKGROUND OF THE INVENTION

Emergency vision devices for aiding pilots to see through vision-impairing smoke to maintain their visual access to critical information, such as that provided by an instrument panel and visual information available outside the cockpit to help pilots safely guide their aircrafts are disclosed in U.S. Pat. Nos. 4,832,287; 5,318,250; and 5,202,798, all issued to Bertil Werjefelt.

The present invention is an improvement over these prior art devices.

OBJECTS AND SUMMARY OF THE INVENTION

It is an object of the present invention to provide an emergency vision device that is relatively compact and easily fits within a briefcase with plenty of room to spare.

It is another object of the present to provide emergency vision device that is relatively fool-proof to deploy.

It is still another object of the present invention to provide an emergency vision device whose electrical components may be checked without actually deploying the device.

It is another object of the present invention to provide an emergency vision device that includes a folded inflatable enclosure that is automatically inflated as it is withdrawn from its housing.

In summary, the present invention comprises an emergency vision device for use in a smoke emergency to enable a user to look through a windshield or view an instrument. The device includes a housing; an inflatable enclosure having a first end for being disposed toward a user, and a second end for being disposed toward the windshield or the instrument, the inflatable enclosure being stored within the housing when not in use, the first and second ends having first and second transparent panels, respectively, such that visual information from the beyond the windshield or from the instrument is transmitted through the second panel to the user through the first panel; a blower operably connected to the inflatable enclosure adapted to inflate the enclosure; a first switch for operating the blower; and a member operably connected to the inflatable enclosure and the first switch such that the switch is activated when the inflatable enclosure is removed from the housing.

These and other objects of the present invention will become apparent from the following detailed description.

BRIEF DESCRIPTIONS OF THE DRAWINGS

FIG. 5 is a cross-sectional view taken along line 3—3 of FIG. 2, showing the arrangement of the inflatable vision unit of the device of FIG. 1 as stowed within the housing of FIG. 2.

FIG. 6 is cross-sectional view similar to FIG. 5, after the inflatable vision unit shown in FIG. 5 has been withdrawn from the housing.

FIG. 7 is a cross-sectional view taken along line 7—7 of FIG. 6.

DETAILED DESCRIPTION OF THE INVENTION

Figure 1:
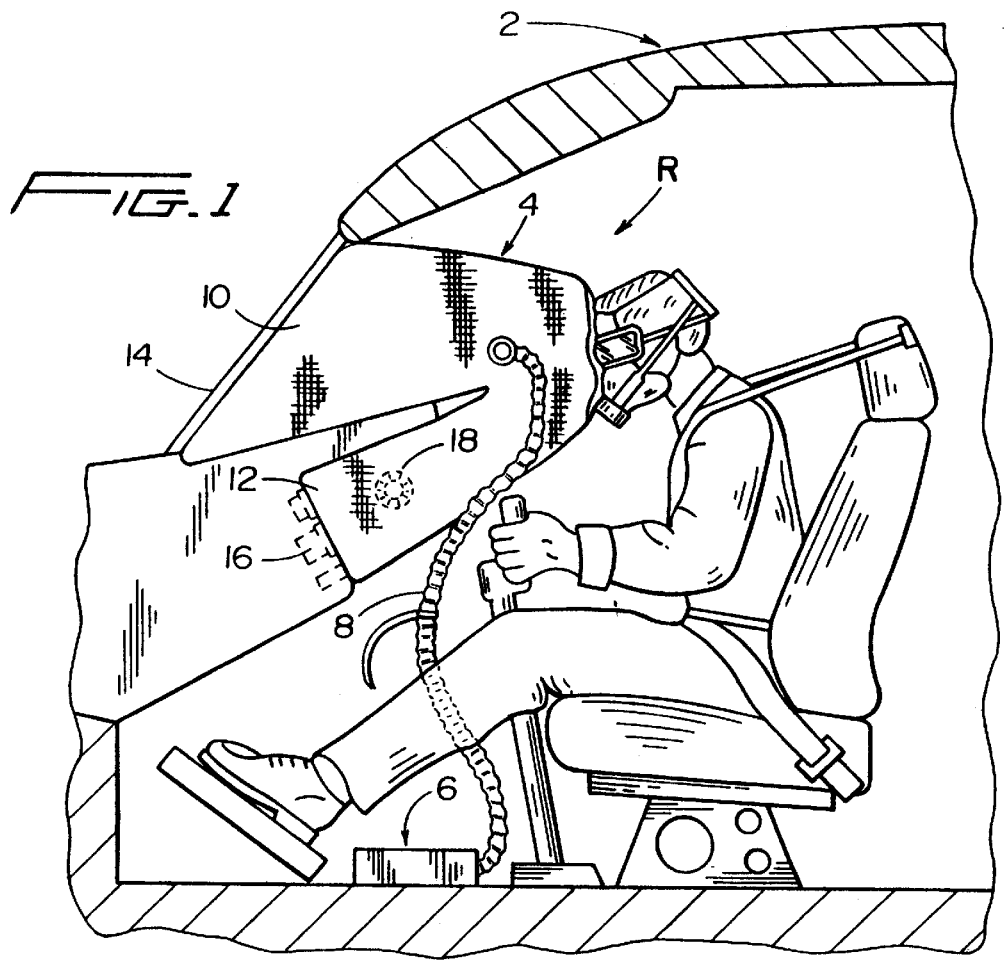
FIG. 1 is a fragmentary cross sectional view of a cockpit, showing an emergency vision device made in accordance with the present invention being used during an emergency.

An emergency vision device R made in accordance with the present invention is disclosed in FIG. 1, as deployed in an aircraft cockpit during a smoke emergency. The device R includes an inflatable enclosure 4 connected to a power unit 6 with a hose 8, as best shown in FIG. 1.

The inflatable enclosure 4 includes a windshield unit 10 and an instrument panel unit 12. The windshield unit 10 allows the pilot or operator to see through the windshield 14 of the cockpit. The instrument panel unit 12 allows the operator to view the instrument panel 16.

The power unit 6 provides filtered air for maintaining controlled inflation of the inflatable enclosure 4. A relief valve 18 maintains the air pressure within the inflatable enclosure 4 at a predetermined level for proper operation.

The emergency vision device R is contained in a housing 20 when it is stored and not in use. The housing 20 has a removable cover 22 for access into the inflatable enclosure 4 stowed within. A test switch 24, which is accessible from the outside of the housing 20, is provided for testing the operation of a blower 26 disposed within the housing 20. Another test switch 28, also accessible from outside the housing 20, is provided as a means for testing the condition of a battery 30 disposed within the housing 20. A green indicator light 32, an orange indicator light 34 and a red indicator light 36 provide indication to the user when the test switch 28 is depressed if the battery 30 is in good condition, needs to be replaced, or inoperative, respectively.

The enclosure 20 is advantageously designed to fit within a briefcase, such as one typically carried by a pilot. The device R would remain within the briefcase until it is needed, at which time it is pulled out and deployed.

The inflatable enclosure 4 is compactly folded and stowed within the housing 20 as best shown in FIG. 5. The inflatable unit 4 is advantageously made from thin plastic material such as TEFLON FEP or ripstop nylon. A pull-out strap 38 bundles the folded inflatable enclosure 4 such that the whole unit can be carried and pulled out of the housing 20 through the access opening 39 when the free ends 40 of the strap 38 are pulled out. VELCRO fasteners 41 are provided for securing the ends 40 together.

Figure 2:
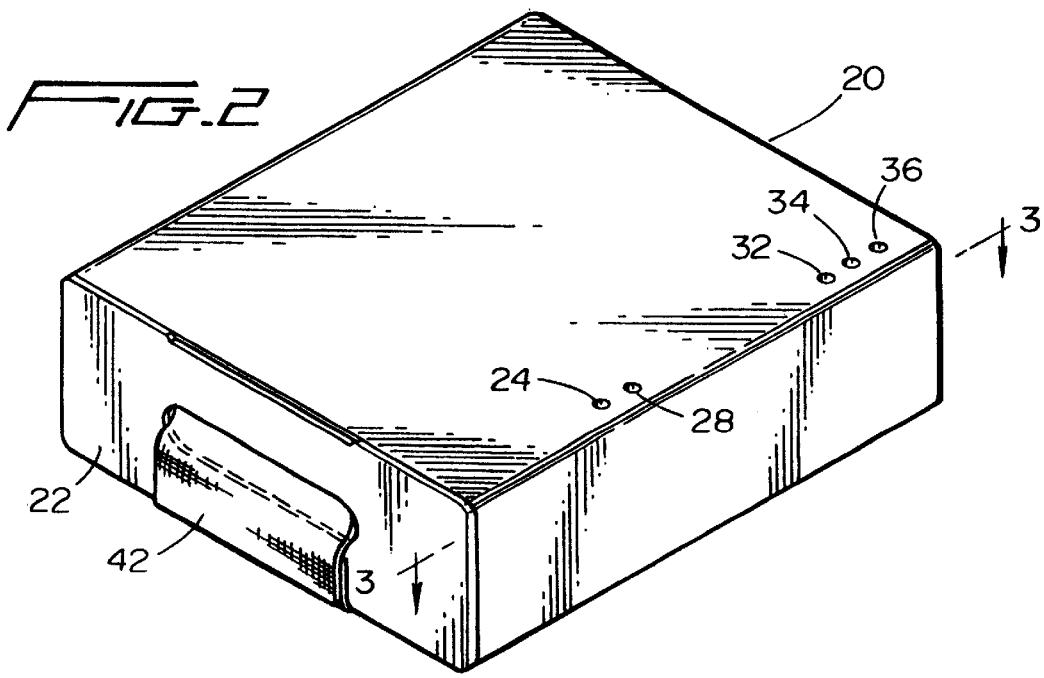
FIG. 2 is a perspective view of a compact housing for the emergency vision device of FIG. 1.
Figure 3:
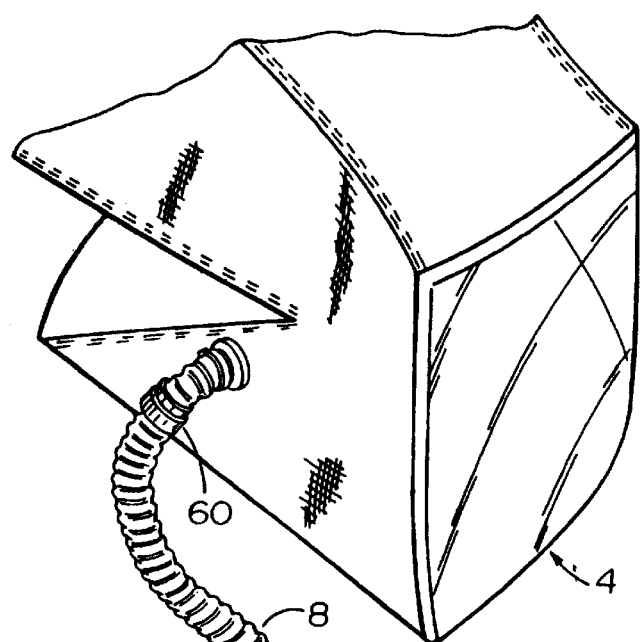
FIG. 3 is a perspective view of the emergency vision device of FIG. 1, with portions shown in fragmentary view, and other portions shown in exploded view.
Figure 4:
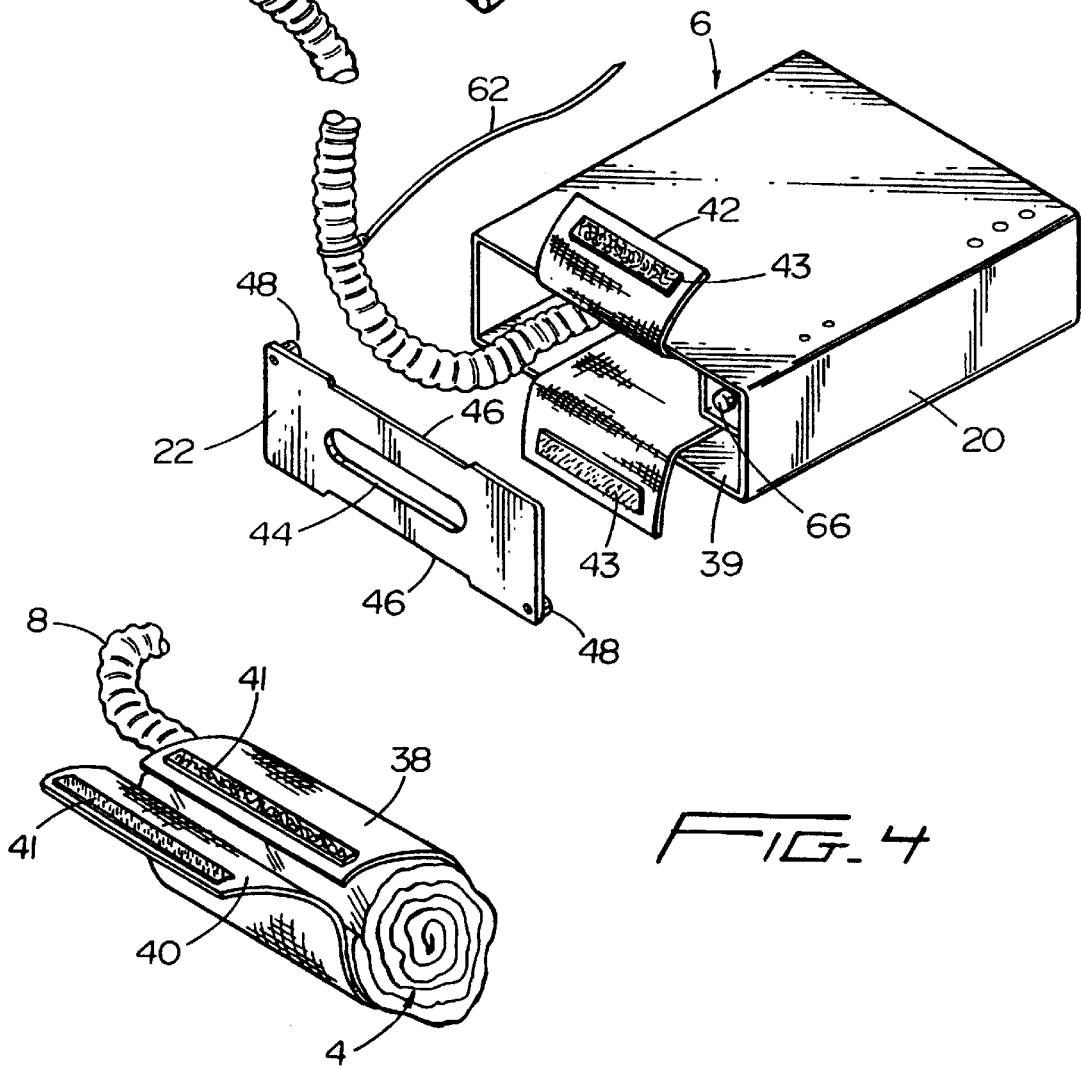
FIG. 4 is a perspective view of the inflatable vision unit of the device of FIG. 1, as shown in the deflated and stowed condition.

The access cover 22 is held in place by a pair of closure straps 42 equipped with VELCRO fasteners 43 or other standard means, as best shown in FIG. 3. The cover 22 includes a central slot 44 and a pair of edge cut-outs 46 adapted to cooperate with the closure straps 42 in order to hold the cover 22 in place, as best shown in FIG. 2. The cover 22 further includes a pair of friction fittings 48 that frictionally engage the respective corners of the housing 20 to further help in securing the cover to the opening 39.

The power unit 6 includes a high performance air filter 50 for providing filtered air for inflating the inflatable enclosure 4. A motor 52 is operably connected to the blower 26. The battery 30 is operably connected to the motor 52.

The hose 8 is advantageously flexible in order to fit within the housing 20 in a compact manner without collapsing, as best shown in FIG. 5. The hose 8 is made from a thin plastic material supported on its outside surface by a plastic spiral wire 56, such that the hose 8 can be compressed longitudinally and bent on a radius without collapsing. Rotatable connectors 58 and 60 connect the hose 8 to the blower 26 and the inflatable enclosure 4, respectively, as best shown in FIG. 5.

The blower 26, filter 50, motor 52 and the battery 30 are advantageously disposed in the rear portion of the housing 20, thereby providing free space near the opening 39 for the inflatable unit 4 and the hose 8 for easy removal during deployment. The hose 8 is advantageously disposed behind the inflatable unit 4 so that during deployment the hose 8 is out of the way of the pilot as he pulls the inflatable unit 4 out of the housing 20.

A longitudinal plastic member 62 has one end operably secured to the hose 8 and another end operably engaged with a microswitch 64 such that when the inflatable enclosure 4 is withdrawn from the housing 2, the member 62 is disengaged from the micro switch 64, causing the motor 52 to be energized and the blower 26 to operate, as best shown in FIGS. 5 and 6. Filtered air is then introduced into the inflatable enclosure 4, thereby inflating the enclosure. A bypass switch 66 maybe used by the operator to turn off the blower 26, as appropriate, such as when the emergency is over.

The hose 8 is connected to the inflatable unit at an upper portion thereof so that the inflating air will fall by gravity to the lower portion of the inflatable unit, thereby assisting in the inflating process.

Figure 8A:
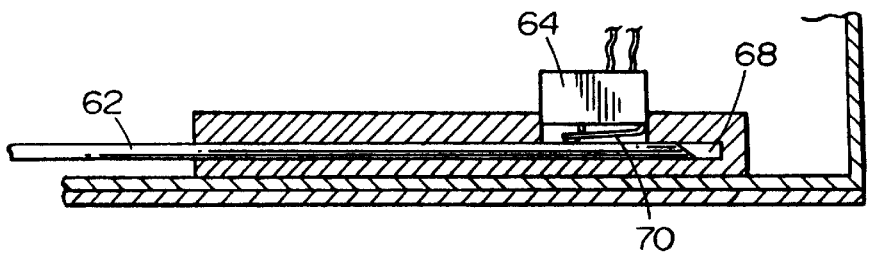
FIGS. 8A and 8B are cross-sectional views taken along line 8—8 of FIG. 5, showing the operation of a microswitch used to automatically operate the device of FIG. 1.
Figure 8B:
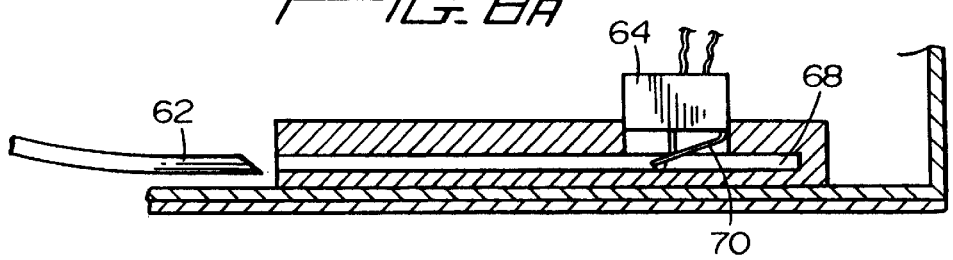
Figure 10:
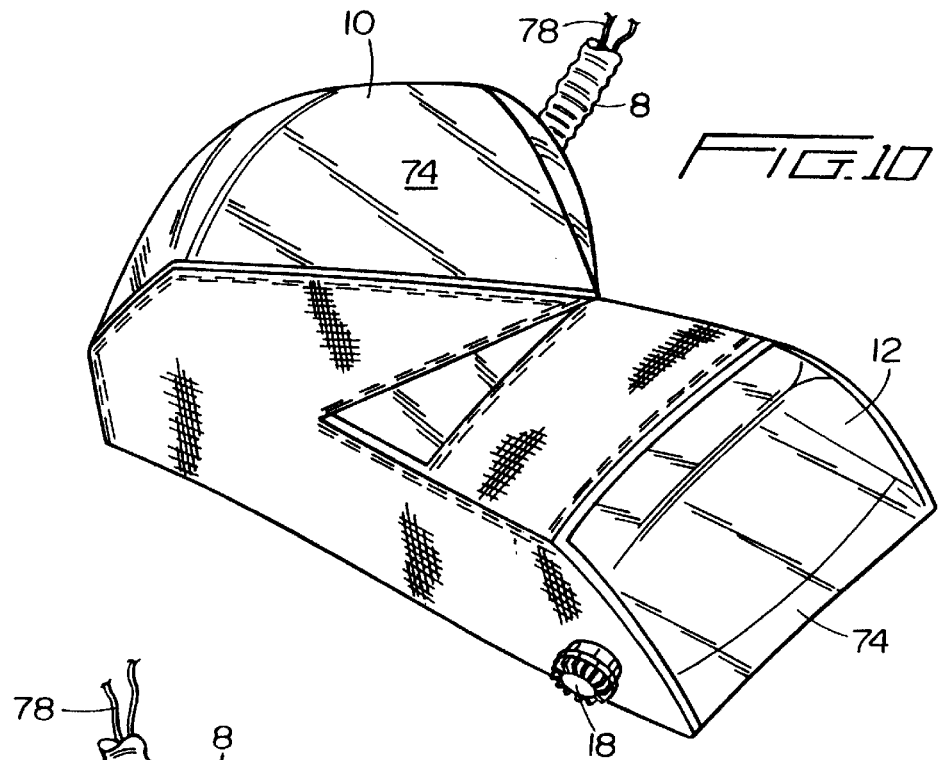
FIG. 10 is a front perspective view of FIG. 9.
Figure 11:
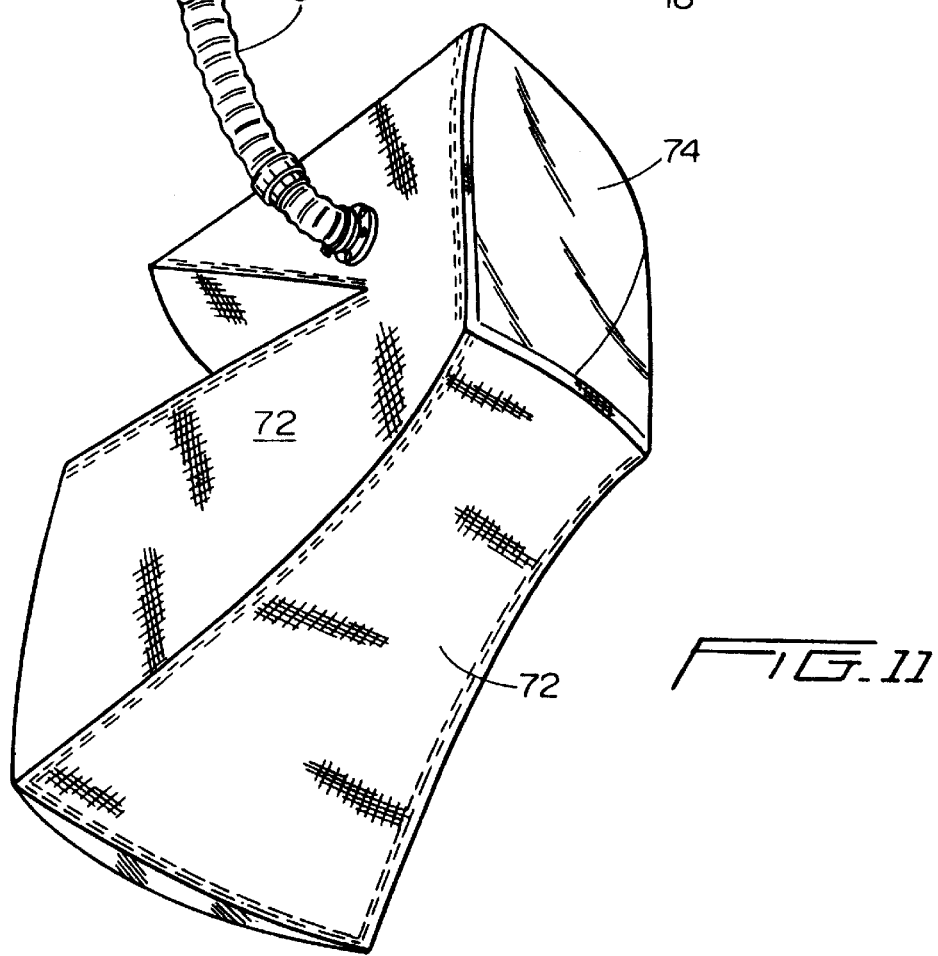
FIG. 11 is a rear perspective view of FIG. 9.

The operation of the microswitch 64 is shown in detail in FIGS. 8A and 8B. The member 62 is guided into an channel or well 68 into which an operating arm 70 of the microswitch 64 is disposed. When the member 62 is inserted into the channel 68, its end portion pushes the operating arm 70 inwardly toward the microswitch 64 in the OFF position, as best shown in FIG. 8A. Similarly, when the member 62 is withdrawn from the channel 68, the operating arm 70 is released, thereby activating the switch to its ON position.

Figure 9:
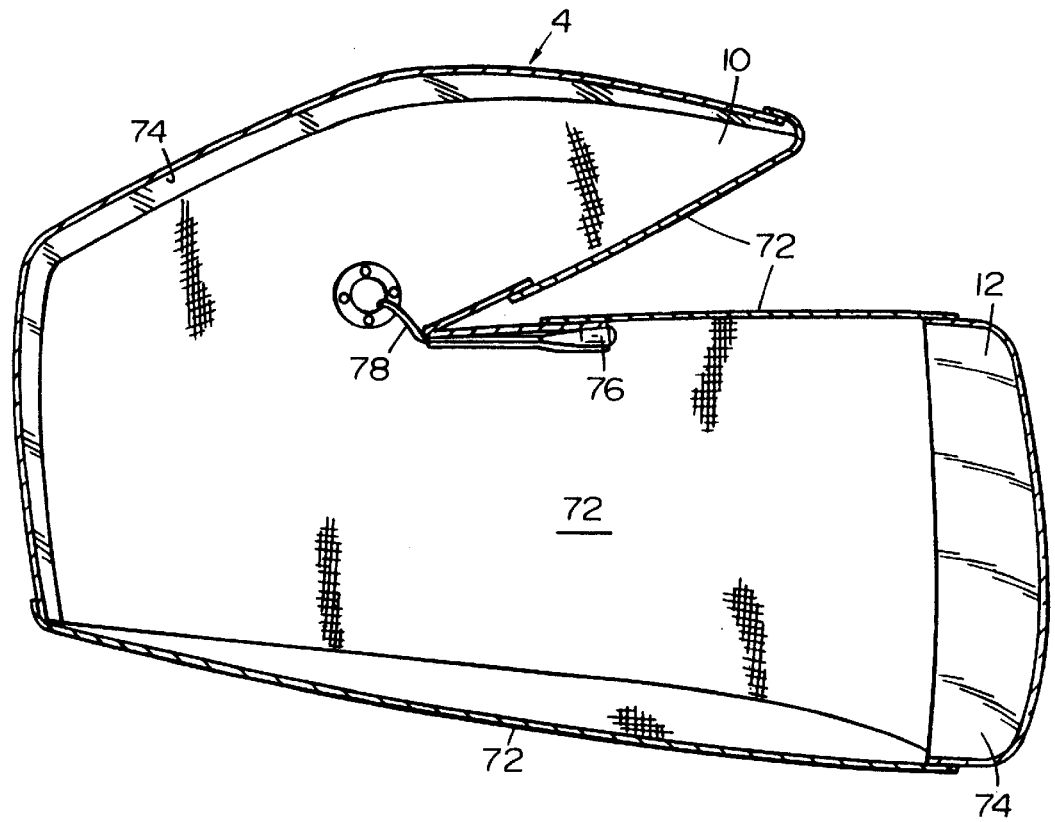
FIG. 9 is a side cross-sectional view of the inflatable vision unit of the device of FIG. 1.

The inflatable enclosure 4 includes semitranslucent panels 72 and clear, transparent panels 74 joined together to form the enclosure, as best shown in FIG. 9. The panel 72 are preferably made from ripstop nylon and the panel 74 from TEFLON FEP, available from E. I. DuPont de Nemours and Company. The thickness is typically 5 mil. Another material is ACLARA 22 5 mil film, available from Allied Signal Corporation. The transparent panels 74 are preferably made from TEFLON FEP 5 mil sheets.

The transparent panels 74 allow the operator to look through the windshield and view the instrument panel 16, as best shown in FIGS. 1 and 9. The windshield unit 10 is configured to fit the curvature of the windshield 14 of the aircraft and be in intimate contact therewith.

The inflatable enclosure 4 is advantageously loosely inflated such that it will conform to and seal over the windshield and the instrument panel so as to exclude smoke from the operator's line of sight and thereby allow the operator visual access through the windshield and the instrument panel. The relief valve 18 allows the pressure within the inflatable enclosure 4 to be regulated and allows the enclosure to conform to and seal over irregularities on the surfaces which it contacts so as to preempt the windshield and/or the displays of any smoke on such surfaces.

The relief valve 18 provides slow leakage of the inflating filtered air to regulate the air pressure within the enclosure 4 to accomplish the functions described above. The inflatable enclosure 4 is, therefore, deformable in order for it to conform to the irregular shape of the windshield, the instrument panel, the eye goggles of the user, etc., in order to exclude smoke from the user's line of sight. A continuous flow of low pressure gas is provided to re-inflate the unit after repeated deformations or partial deflations. The inflatable visual enclosure 4 maintains a very low pressure differential on the order of one to two inches of water, thereby facilitating that the enclosure 4 conforms to the contours of the windshield and the instrument panel and the pilot's goggles or face mask that is used in an emergency.

The deformable nature of the inflatable enclosure 4 further allows the user to manipulate the yoke through all the necessary movements, while deforming or deflating the enclosure 4 as the pilot manipulates the yoke. The yoke is more or less out of the pilot's line of sight toward the instrument panel only when the aircraft is in level flight. The instrument panel unit 12 of the inflatable enclosure 4 is inflated between the yoke and the instrument panel, which would interfere with the user's movement of the yoke if the enclosure 4 is not deformable and deflatable.

The continuous operation of the blower 26 re-inflates the inflatable unit 4 continuously to compensate for these deflations. The capability to re-inflate continuously compensates for the varying external pressure change so that it has more or less a pressure deferential to the external air in the aircraft of about one or two inches of water in order to maintain its form and function. A substantial amount of air is needed for continual proper inflation of the inflatable unit 4. The blower 26 and the filter 50 provides the required amount of inflating gas that is practical and without weight penalties associated with compressed gas storage tanks.

A light 76 is provide within the instrument panel unit 12 to aid the operator to view the instrument panel in case of diminished illumination within the cockpit. Wires 78 are advantageously routed within the hose 8 for protection against wear and tear. The wires 78 are operably connected to the battery 30. The light 78 is automatically lit when the inflatable enclosure 4 is deployed and the blower 26 is automatically energized by the withdrawal of the member 62 away from the microswitch 64.

In operation, the closure straps 42 are removed to release and remove the cover 22 from the housing 20. The straps 38 are then pulled out, carrying with it the inflatable unit 4. The ends 40 of the strap 38 are released. As the inflatable unit 4 is pulled out of the housing 20, the hose 8 is played out, carrying with it the member 62, which then activates the switch 64, causing the blower 26 to operate and pump air into the inflatable unit 4. The filter 50 cleans the ambient air of any smoke particles so that only clear air is introduced into the inflatable unit 4.

The unit 4, now inflated, is positioned against the windshield 14 and the instrument panel 16, thereby excluding any smoke in the line of sight of the operator. The clear panel 74 of the instrument panel unit 12 is pressed against the instrument panel 16. The clear panel 74 of windshield unit 10 is pressed against the windshield 14. The operator is, therefore, able to see through the windshield 14 and the instrument panel 16 during the smoke emergency, providing the operator with the information necessary to control the aircraft safely.

While this invention has been described as having preferred design, it is understood that it is capable of further modification, uses and/or adaptations of the invention following in general the principle of the invention and including such departures from the present disclosure as come within known or customary practice in the art to which the invention pertains, and as may be applied to the essential features set forth, and fall within the scope of the invention or the limits of the appended claims.

I claim:

1. An emergency vision device for use in a smoke emergency to enable an user to look through a windshield or view an instrument, comprising:

a) a housing;

b) an inflatable enclosure having a first end for being disposed toward an user, a second end for being disposed toward the windshield or the instrument, said inflatable enclosure being stored within said housing when not in use;

c) said first and second ends having first and second transparent panels, respectively, such that visual information from beyond the windshield or from the instrument is transmitted through said second panel to the user through said first panel;

d) a blower operably connected to said inflatable enclosure adapted to inflate said enclosure;

e) a first switch for operating said blower; and f) a member operably connected to said inflatable enclosure and said first switch such that said first switch is activated when said inflatable enclosure is removed from said housing, thereby displacing said member relative to said switch.

2. An emergency vision device as in claim 1, wherein:

a) a hose connected to said inflatable enclosure and said blower; and b) said member is secured to said hose such that withdrawal of said hose from said housing causes said member to disengage from said first switch.

3. An emergency vision device as in claim 1, wherein:

a) said member is guided within a channel;

b) said first switch includes an actuating arm disposed within said channel, said arm being biased in an on position; and c) said member engages said arm such that said arm is positioned in an off position.

4. An emergency vision device as in claim 1, wherein:

a) a second switch in series with said first switch adapted to turn off said blower after being activated by said first switch.

5. An emergency vision device as in claim 4, wherein:

a) said second switch is accessible within said housing.

6. An emergency vision device as in claim 1, wherein:

a) a third switch accessible outside said housing, said third switch is adapted to test the operation of said blower.

7. An emergency vision device as in claim 1, wherein:

a) a battery disposed within said housing, said battery being operably connected to said blower; and b) a fourth switch accessible outside said housing adapted to test said battery.

8. An emergency vision device as in claim 1, wherein:

a) a light disposed within said enclosure.

9. An emergency vision device as in claim 8, wherein:

a) a hose disposed between said enclosure and said blower; and b) wires operably connected to said light and disposed within said hose.

10. An emergency vision device as in claim 1, wherein:

a) a relief operably connected to said enclosure.

11. An emergency vision device, comprising:

a) a housing;

b) an inflatable vision unit disposed within said housing;

c) a blower adapted to supply air to said inflatable vision unit;

d) a filter in series with said blower adapted to filter ambient air of smoke particulates; and e) a first switch for automatically activating said blower when said inflatable vision unit is pulled out of said housing.

12. An emergency vision device as in claim 11, wherein:

a) a hose connected to said vision unit and said blower.

13. An emergency vision device as in claim 11, wherein:

a) said vision unit includes an upper and lower portion; and b) said hose is connected to said upper portion such that air falls down by gravity to said lower portion to assist in inflating said vision unit.

14. An emergency vision device as in claim 11, wherein:

a) a hose connected to said inflatable enclosure and said blower; and b) a member is secured to said hose such that withdrawal of said hose from said housing causes said member to disengage from said first switch.

15. An emergency vision device as in claim 11, wherein:

a) said member is guided within a channel;

b) said first switch includes an actuating arm disposed within said channel, said arm being biased in an on position; and c) said member engages said arm such that said arm is positioned in an off position.

16. An emergency vision device as in claim 11, wherein:

a) a second switch in series with said first switch adapted to turn off said blower after being activated by said first switch.

* * * * *